Sept. 5, 1933.  A. R. KELLER  1,925,731
SIEVE
Filed Aug. 22, 1932   3 Sheets-Sheet 1

ANDREAS R. KELLER.
INVENTOR
BY Erich J. Michaelis
ATTORNEY

Sept. 5, 1933.  A. R. KELLER  1,925,731
SIEVE
Filed Aug. 22, 1932   3 Sheets-Sheet 2

ANDREAS R. KELLER
INVENTOR
BY Erich H. Michaelis
ATTORNEY

Sept. 5, 1933.  A. R. KELLER  1,925,731
SIEVE
Filed Aug. 22, 1932   3 Sheets-Sheet 3

ANDREAS R. KELLER
INVENTOR.

BY Erich F. Michaelis
ATTORNEY.

Patented Sept. 5, 1933

1,925,731

UNITED STATES PATENT OFFICE 1,925,731

SIEVE

Andreas R. Keller, Lombard, Ill.

Application August 22, 1932. Serial No. 629,989

4 Claims. (Cl. 210—154)

The invention relates to sieves and more especially to tubular sieves.

The object of the invention is to provide a tubular sieve, which is adapted to be used in connection with a mash tank.

Another object of the invention is to provide a tubular sieve, which is adapted to be fastened to a spider arm, which in turn is rotatably mounted inside a mash tank.

A further object of the invention is to provide a tubular sieve, which consists of a metal frame holding a tubular sieve body the interior of the sieve being mash proof, that is the interior of the sieve being secured against the entrance of the thick ingredients of the mash.

A still further object of the invention is to support the tubular sieve on the spider arm in such a manner, that the sieve forms a connecton between the thin fluid wort in the mash tank, and the thick heavy ingredients of the mash settling on the bottom of the mash tank.

Another object of the invention is to attach the sieve to the spider arm in such a manner, that the sieve may be arranged vertically or horizontally the latter position of the sieve facilitating the cleaning of said sieve.

Another object of the invention is to protect that part of the sieve, which will be forced through the heavy thick portion of the mash in the tank when the spider arm is rotated in the tank.

Other objects of the invention not specifically mentioned may be easily ascertained and understood from the following description in connection with the accompanying drawings forming a part thereof. It is however to be understood, that the invention is not to be limited or restricted to the exact formation and construction shown in the drawings and described in the specification, but that said invention is only to be limited by the scope of the claims appended hereto.

In the drawings illustrating a preferred embodiment of the invention.

Figure 1:
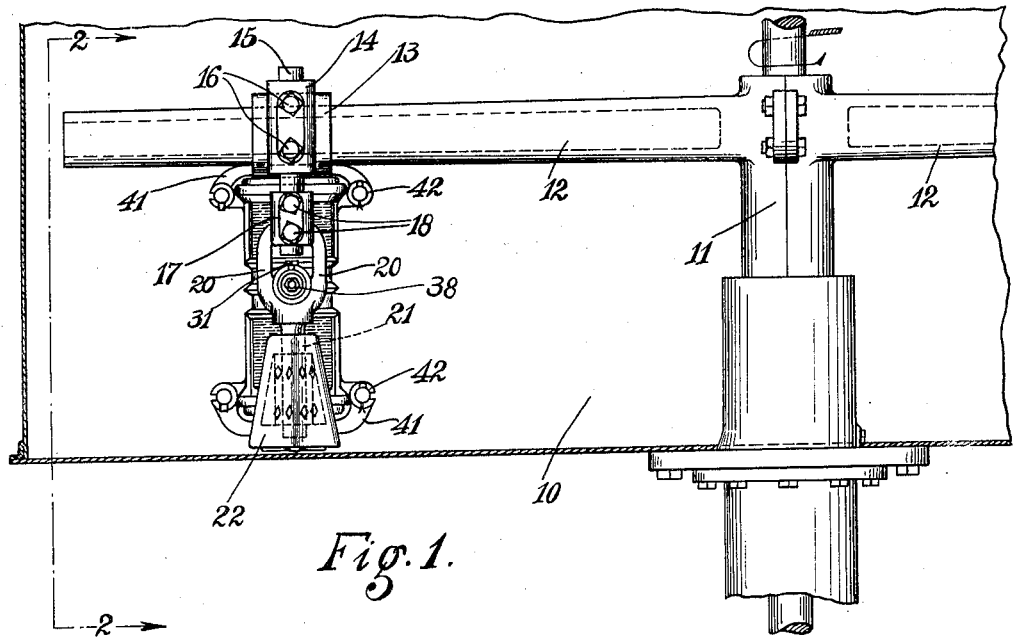
Fig. 1 is a front view of a sieve according to the present invention and a plow protecting said sieve supported by a spider arm which is rotatably mounted inside a mash tank.
Figure 2:
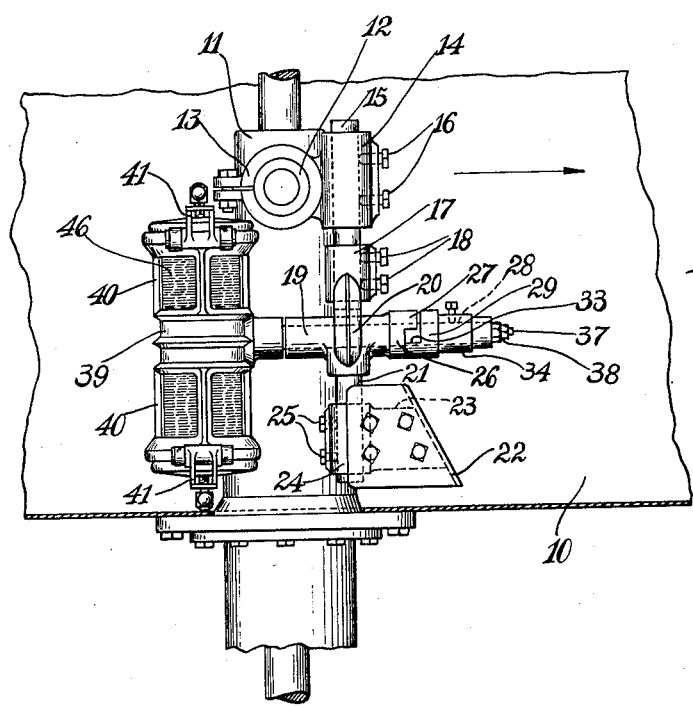
Fig. 2 is a view taken on line 2—2 of Fig. 1.
Figure 5:
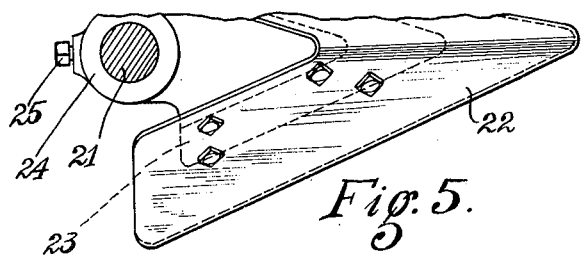
Fig. 5 is a sectional view taken on line 5—5 in Fig. 3.
Figure 6:
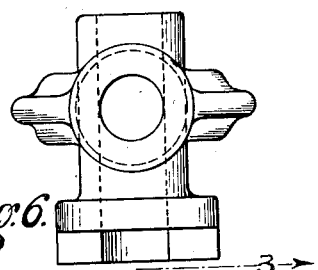
Fig. 6 is a top view of Fig. 4.

In a mash tank 10 a spider 11 is rotatably mounted having a plurality of radial extending arms 12. On one or more of said arms a cross-piece is removably attached by means of a clamping part 13, forming an integral part of the cross-piece. A sleeve 14 being another integral part of said cross-piece is adapted to receive a short vertical shaft 15, which is held in position by means of bolts 16. On the lower part of the short vertical shaft 15 a second sleeve 17 is adjustably attached by means of bolts 18. A horizontal sleeve 19 is rigidly connected to the second sleeve 17 by means of lateral pieces 20. The second sleeve 17, the horizontal sleeve 19, and the lateral pieces 20 may be cast as one unit.

A second vertical shaft 21 extends downwardly from the horizontal sleeve 19, and a plow 22 is adjustably fastened to the second vertical shaft 21 by means of a strap 23 having a sleeve 24, which is adapted to receive the second vertical shaft and to be adjustably fastened thereon by means of bolts 25.

The horizontal sleeve 19 has on its outer end a flange 26, provided with a axially extending shoulder 27. A horizontal shaft 28 extends through the horizontal sleeve 19 and outside of the flange 26 another sleeve 29 is removably fastened to the horizontal shaft 28 by any suitable means, for instance by means of a key 30 and a bolt 31. This sleeve 29 is provided on its inner end with a flange 32 having an inwardly extending shoulder 33, which is adapted to engage the shoulder 27 of the first horizontal sleeve. A hollow cylindrical casing 34 is open on one end, and is provided in its bottom with an opening, permitting the outer end of the horizontal shaft 28 to extend therethrough. The bottom of the casing abuts the outer end of the sleeve 29, and a coil spring 35 surrounds the end of the horizontal shaft 28. A cylindrical cap 36 fits snugly and slidingly into the housing 34. The inner end of the cap is open, and the outer wall of said cap is provided with a central hole. A stud 37 is inserted into the end of the horizontal shaft 28, and extends through the central hole of the cap 36. A pair of adjusting nuts 38 are adapted to adjust the pressure of the spring 35 by urging the cap 36 into the housing 34 or permitting the cap to slide outwardly thereof. The spring 35 abuts with one of its ends the bottom of the housing 34, and with its other end, the end wall of the cap 36.

Figure 7:
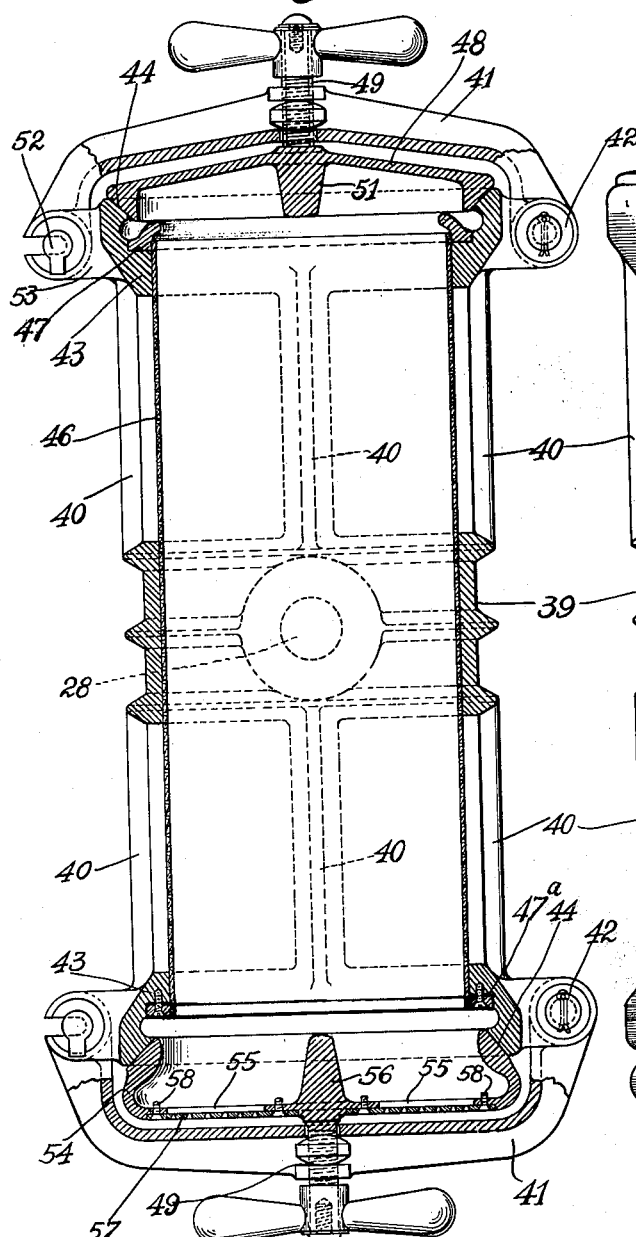
Fig. 7 is a longitudinal sectional view through the sieve of the present invention.
Figure 8:
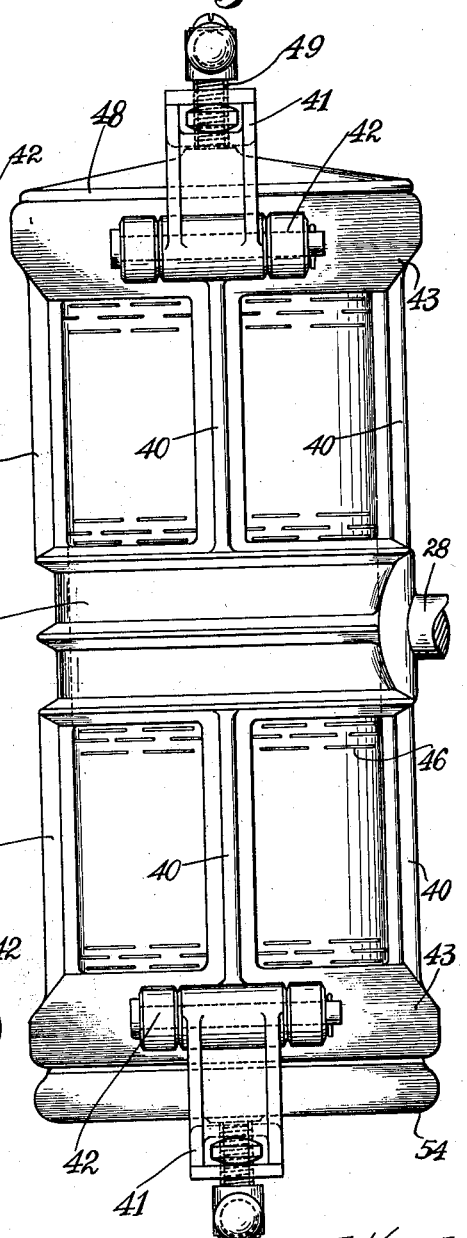
Fig. 8 is an elevational view of the sieve according to the present invention.

The inner end of the horizontal shaft 28 is rigidly fastened to a cage adapted to receive a tubular sieve. The cage may be constructed in any desired and suitable manner, but consists preferably of a central substantially cylindrical portion 39, from which a plurality of ribs 40 extend axially and upwardly and downwardly as shown in Figs. 7 and 8. On both ends of the frame a clamping piece 41 is connected to said frame, as indicated at 42 in Figs. 7 and 8. The ribs 40 are on their outer end provided with an inner inclined surface, making it possible to set a ring 43 firmly and tightly on these surfaces. The outer end of each of these rings is provided with a valve seat, as indicated at 44 in Fig. 9, and besides that with a shoulder 45. The inner circular surface of the cylindrical center portion 39 of the frame, and of the inner ends of the rings 43 have the same diameter, and are arranged concentrically, so that a tubular sieve 46 may be inserted into the frame and rest tightly against the inner surface of said rings and said center portion. On the upper end of the sieve 46 a holding ring 47 is fastened in any convenient manner. This ring rests on the shoulder of the upper ring 43. To the shoulder of the lower ring 43 a stop ring 47a is fastened on which the sieve 46 rests. The opening of rings 43 the circumference whereof is shaped into a valve seat is closed by means of a lid 48 having a valve seat formed thereon adapted to engage the valve seat 44 of the ring 43. In the clamping piece 41 a clamping screw 49 is provided, which is adapted to engage the center of the lid 48. When then the lid and the clamping piece is put in the position shown in Fig. 7 and is held in this position by means of a locking pin 52 which extends through slots provided for this purpose in the free end of the clamping piece 41 and in a pair of ears 53 formed on the cage, it is only necessary to tighten the clamp screw 49 to seat the lid firmly on the ring 43.

On the lower end a ring 54 is arranged to take the place of the lid 48. This ring 54 has also a valve seat with which it may engage the valve seat of the lower ring 43. The ring 54 is provided with a plurality of spokes 55, which connect a hub 56 with the ring 54. A circular sieve plate 57 is fastened to the ring and the hub by means of screws 58. In the lower clamping piece 41 a clamping screw 49 is provided adapted to engage the upper surface of the hub 56.

Figure 9:
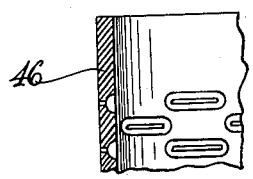
Fig. 9 is a detail view of the sieve plate proper.

In Fig. 9 is shown a preferred embodiment of the different sieve plates. It is however to be noted, that any other construction of a sieve may be used.

The apparatus described above operates as follows: When the different parts are assembled, and are fastened to the spider arm, and when the spider is set in rotation the plow will prevent the thick and heavy mash from pressing against the sieve, so that said sieve will be protected from excessive pressure. The assembled sieve will be in vertical position, so that the upper portion of the sieve will be located in and surrounded by the thin fluid wort while the lower part of the sieve will extend into a thick settlement of the mash. In this manner the sieve forms a connecting piece between the thin wort and the heavy mash, and in addition to that forms a conduit for the wort through the heavy thick settlement toward the bottom of the tank from where the fluid will be drained. In older constructions the thick mash prevented the wort from flowing to the drain, so that it took a long while before the wort penetrated through the settlement. By means of the sieve according to the present invention the drainage of wort will be facilitated. It is to be understood, that when the wort is drained from the tank, the spider is standing still.

Figure 3:
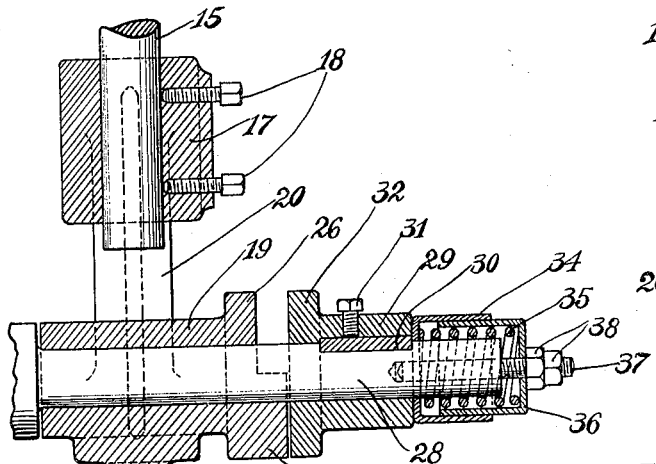
Fig. 3 is a side view of a plow used for the purpose of protecting the sieve and a sectional view of the means for rotatably supporting the sieves. The sectional part of Fig. 3 is taken on line 3—3 of Fig. 4.
Figure 4:
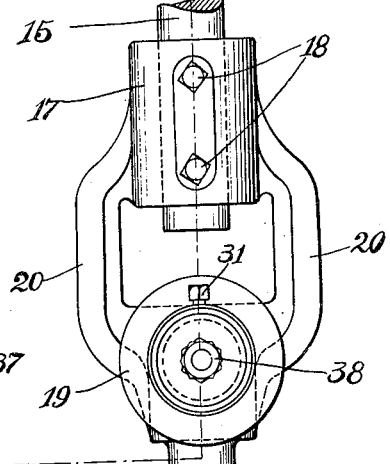
Fig. 4 is a front view of Fig. 3.

When the tank is empty, the cage may be arranged in a horizontal position by being rotated about the axis of the horizontal shaft 28. This is possible in consequence of the means for supporting and holding the sieve as shown especially in Fig. 3. When then the sieve is arranged in horizontal position it may be easily cleaned. The shoulders 27 and 33 will prevent accidental movement out of the adjusted position.

Having described my invention and how the same is to be performed, I claim as new, and desire to secure by Letters Patent.

1. In a device of the class described the combination of a spider arm rotatably mounted in a tank with a cylindrical sieve, an open cage adapted to receive said sieve and means for adjustably attaching said cage to said spider arm.

2. In a device of the class described the combination of a spider arm rotatably mounted in a tank with a cylindrical sieve an open cage adapted to be adjustably fastened to the spider arm and to receive the cylindrical sieve, a lid adapted to be firmly, but removably attached to the upper end of the sieve, and a circular sieve adapted to be attached firmly, but removably to the lower end of said cylindrical sieve.

3. In a device of the class described a spider arm rotatably mounted in a tank with an open cage, means for adjustably fastening said cage to the arm, a tubular sieve adapted to be located in said cage a lid adapted to be firmly, but removably attached to the upper end of the cage, a circular sieve adapted to be firmly but removably attached to the lower end of the cage, and means supported by the spider arm for protecting the tubular sieve against excessive pressure.

4. In a device of the class described the combination of a spider arm rotatably mounted in a tank with a plow, means for adjustably fastening said plow to the arm, a horizontal shaft rotatably held by said means, a cage fastened to said horizontal shaft, a tubular sieve arranged in said cage, a lid for the upper end of said cage, means for firmly but removably urging said lid against said cage, a circular sieve arranged on the lower end of the cage, and means for firmly but removably holding said circular sieve in position.

ANDREAS R. KELLER.